UNITED STATES PATENT OFFICE.

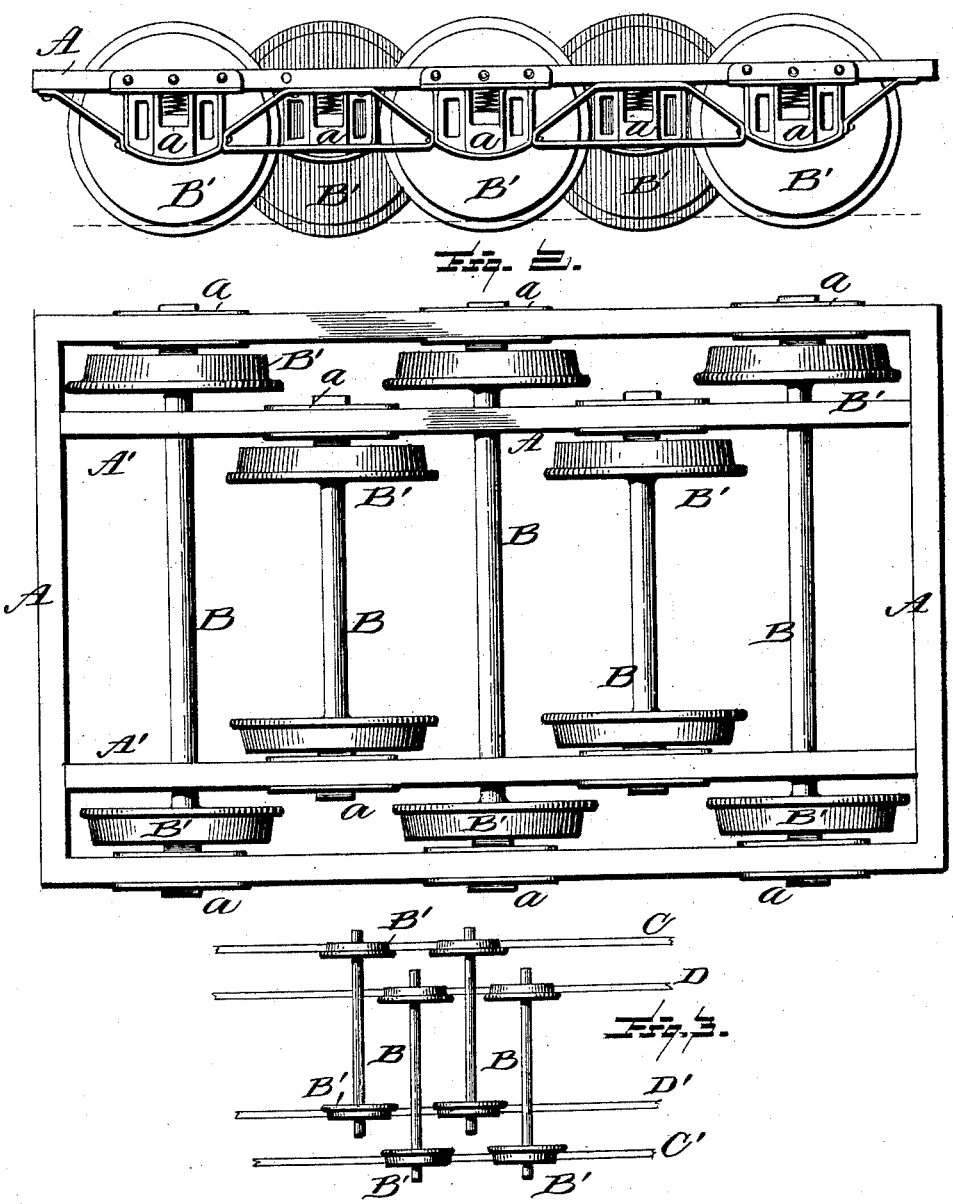

ALEXANDER T. LOYD, OF CHICAGO, ILLINOIS.

CAR-TRUCK.

SPECIFICATION forming part of Letters Patent No. 485,286, dated November 1, 1892.

Application filed February 13, 1892. Serial No. 421,407. (No model.)

*To all whom it may concern:*

Be it known that I, ALEXANDER T. LOYD, a citizen of the United States, residing at Chicago, in the county of Cook, State of Illinois, have invented certain new and useful Improvements in Railroad Trucks and Tracks, of which the following is a specification, reference being had therein to the accompanying drawings.

This invention has relation to railroad-trucks and tracks for the same of that class which has heretofore embodied a road-bed having two parallel rails at each side, and thus constituting a singe track of four rails. The trucks to be used upon said track have involved in their construction four wheels upon a single axle, and a truck comprising within itself an independent truck with wheels—two on each axle—for the inner rails, constituting a narrow-gage road-bed, which independent truck was adapted to be lowered, so as to carry the main truck, whose wheels when being carried were raised out of contact of any rails. The prior art also includes the arrangement of two narrow-gage roads parallel with and at a distance from each other, and the provision of a widely-extended car, at each corner of which a truck of ordinary construction and adapted to the narrow-gage road has been secured. In this instance two locomotives—one for each track and firmly bound together by suitable framework—are employed as the motive power.

My invention has for its object among others that of securing the safety of a four-railed track without the necessarily-excessive expense attending the adoption and use of the truck construction and road-beds heretofore employed. It is apparent that in the employment of two narrow-gage roads double, if not more than double, the width of roadway is absolutely required, and this item alone practically prevents the adoption of such road-bed in thickly settled portions of the country, which portions are the principal places that demand rapid and safe travel. In the instance of the prior art where four wheels are mounted on a single axle the percentage of liability of breakage of axles is largely increased, while in my construction this percentage is proportionately diminished. Not only do I secure the safety attending an increase in the number of the rails, which, though double that of an ordinary track, does not require double the expense of the single track, but only the additional rails and securing them in position, but I arrange the wheels and axles and construct my truck so as to utilize all the axles and wheels and framework of the truck as now constructed, and can also utilize either narrow-gage axles and wheels or imperfect and worn wide-gage axles. In this latter form my truck would comprise long and short axles alternately and successively arranged, as desired, while in the use of long axles only they may be shifted to ride upon an inner and an outer rail.

Other objects and advantages of the invention will appear in the following description, and the novel features thereof will be pointed out in the claims.

The invention is clearly illustrated in the accompanying drawings, which, with the letters of reference marked thereon, form a part of this specification, and in which—

Figure 1 is a side elevation of my improved truck. Fig. 2 is a top plan thereof. Fig. 3 is a plan showing the arrangement of the rails and one of the forms of arrangement of the wheels and axles.

Like letters of reference indicate like parts throughout the several views in which they occur.

Referring now to the details of the drawings by letter, A designates the framework of an ordinary wide-gage truck provided with the ordinary spring-bearings $a$ for the axles. Additional timbers, as A', may be employed where necessary.

The axles according to my invention admit of a variety of arrangements. For instance, I may employ all narrow-gage axles, as seen in Fig. 3, in which the axles are designated by the letter B, the said axles being alternately arranged so that the wheels will alternate, as seen in the said Fig. 3; or I may employ long and short axles, as seen in Fig. 2, and even these may admit of varied arrangements. For instance, I may employ a short axle between each two long axles, as seen at either the right or left of Fig. 2, or a long axle between each two short axles, as seen at the center of said figure. Other arrangements may be resorted to without departing from the essence of the invention or detracting from its merits. The wheels B' may be of ordinary construction.

It is of course to be understood that all of the axles are so arranged that the wheels all travel on the tracks at the same time—that is, part are not elevated when traveling, as has heretofore been proposed, and then lowered and the other set raised. With this alternating arrangement it will be seen that I am enabled to get the wheels so that they practically support directly all parts of the truck, whereby the car will travel with much less jolt or vibration than where the wheels are so far separated.

In laying the double or four-rail track I aim to utilize the old rails and ties, and to the accomplishment of this end, looking at Fig. 3, we will suppose that the rails marked C and C' are the rails of a wide-gage track already laid. I then lay the rails D and D' the required distance from the rails C and C'—a few inches—on the same ties; or it may be that the rails C' and D are the ordinary rails already laid. Then I lay the rail D' inside the two rails and the rail C outside thereof the required distance, and as this is only a few inches and the ordinary ties extend several inches outside the rails the old ties can be utilized for this purpose. Either arrangement may be employed, as found most desirable, depending upon the construction of the bed and the distance between the rails. By either arrangement I utilize the old rails and ties.

The advantages of the construction above described will be readily appreciated. I not only obtain the safety attendant upon an increase of the number of rails at minimum cost, but provide an easier-riding truck with all its wheels at all times traveling on the rails, and lessen the tendency to accident and breakage of the axles.

Modifications in arrangement of the wheels and axles may be resorted to so long as they all travel upon the rails at the same time and are not arranged more than two on the one axle.

What I claim as new is—

1. A railroad-truck provided with a plurality of axles rotatably fixed in the same horizontal plane and carrying wheels arranged in different vertical planes, the tread of all the wheels on the truck being in a common horizontal plane, as set forth.

2. A railroad-truck provided with a plurality of rotatably-fixed axles arranged in the same horizontal plane and wheels on the said axles and alternately arranged in different vertical planes with the treads of all the wheels in the same horizontal plane, as set forth.

3. The combination, with a four-rail track, of a truck having a plurality of axles arranged in the same horizontal plane and wheels on the said axles in different vertical planes to at all times travel on said track, substantially as specified.

4. A railroad-truck provided with a plurality of long and short axles arranged in a common horizontal plane and wheels on the said axles arranged in different vertical planes, substantially as specified.

5. A railroad-truck provided with a plurality of long and short axles arranged in a common horizontal plane and fixedly rotatable and wheels on the said axles alternately arranged in the same horizontal plane, but in different parallel vertical planes, substantially as specified.

6. A truck-frame provided with a series of long axles extending from side to side thereof and intermediate short axles journaled upon intermediate rails of the truck-frame, the journals of all the axles being arranged in a common plane and all of the axles being provided with wheels of a common diameter and adapted to run on a road-bed comprising two parallel rails at each side thereof, substantially as specified.

In testimony whereof I affix my signature in presence of two witnesses.

ALEXANDER T. LOYD.

Witnesses:
A. C. TROWBRIDGE,
E. J. DILLON.